US008225765B2

(12) United States Patent
Kortas et al.

(10) Patent No.: US 8,225,765 B2
(45) Date of Patent: Jul. 24, 2012

(54) TWO-PART PISTON FOR AN INTERNAL COMBUSTION ENGINE

(75) Inventors: Jochen Kortas, Murr (DE); Timo Estrum, Stuttgart (DE); Dieter Messmer, Remseck (DE)

(73) Assignee: MAHLE International GmbH, Stuttgart (DE)

( * ) Notice: Subject to any disclaimer, the term of this patent is extended or adjusted under 35 U.S.C. 154(b) by 218 days.

(21) Appl. No.: 12/733,652

(22) PCT Filed: Aug. 23, 2008

(86) PCT No.: PCT/DE2008/001394
§ 371 (c)(1),
(2), (4) Date: Jul. 21, 2010

(87) PCT Pub. No.: WO2009/033446
PCT Pub. Date: Mar. 19, 2009

(65) Prior Publication Data
US 2010/0307445 A1 Dec. 9, 2010

(30) Foreign Application Priority Data
Sep. 15, 2007 (DE) ........................ 10 2007 044 106

(51) Int. Cl.
*F02F 3/00* (2006.01)
*F16J 1/06* (2006.01)

(52) U.S. Cl. .................................................... 123/193.6

(58) Field of Classification Search .................... 92/186, 92/216, 219, 222, 231, 255–260; 123/193.6, 123/41.35; 29/888.042, 888.044
See application file for complete search history.

(56) References Cited

U.S. PATENT DOCUMENTS 3,349,672 A 10/1967 Meier et al.
4,011,797 A 3/1977 Cornet
4,356,800 A * 11/1982 Moebus .................... 123/193.6
4,581,983 A 4/1986 Moebus
(Continued)

FOREIGN PATENT DOCUMENTS

DE 24 34 902 2/1975
(Continued)

OTHER PUBLICATIONS

International Search Report.
(Continued)

*Primary Examiner* — M. McMahon
(74) *Attorney, Agent, or Firm* — Collard & Roe, P.C.

(57) ABSTRACT

The invention relates to a two-piece piston (1) for an internal combustion engine, comprising a piston base body (2) and a ring element (3), which is soldered to the piston base body (2) by an upper solder connection (23) having the length b, which is disposed on the radial inside of a piston crown (4) formed at least partially by the ring element (3), and by a lower solder connection (24) having the length c, which is disposed radially outside on the top of a center part (9). In order to improve the strength of the solder connections (23) and (24) due to pressure and temperature-related deformations of the upper piston part, the ring element (3) has a peripheral, upper, thinner wall region (49) in the region of the piston crown (4) radially outside the upper solder connection (23) and further a peripheral, lower, thinner wall region (50) between the ring section (5) and the lower solder connection (24), wherein the thickness a and b of the thinner wall regions (49) and (50) has a lower value than the length b and c of the solder connections (23) and (24).

7 Claims, 4 Drawing Sheets

U.S. PATENT DOCUMENTS

Figure 1:
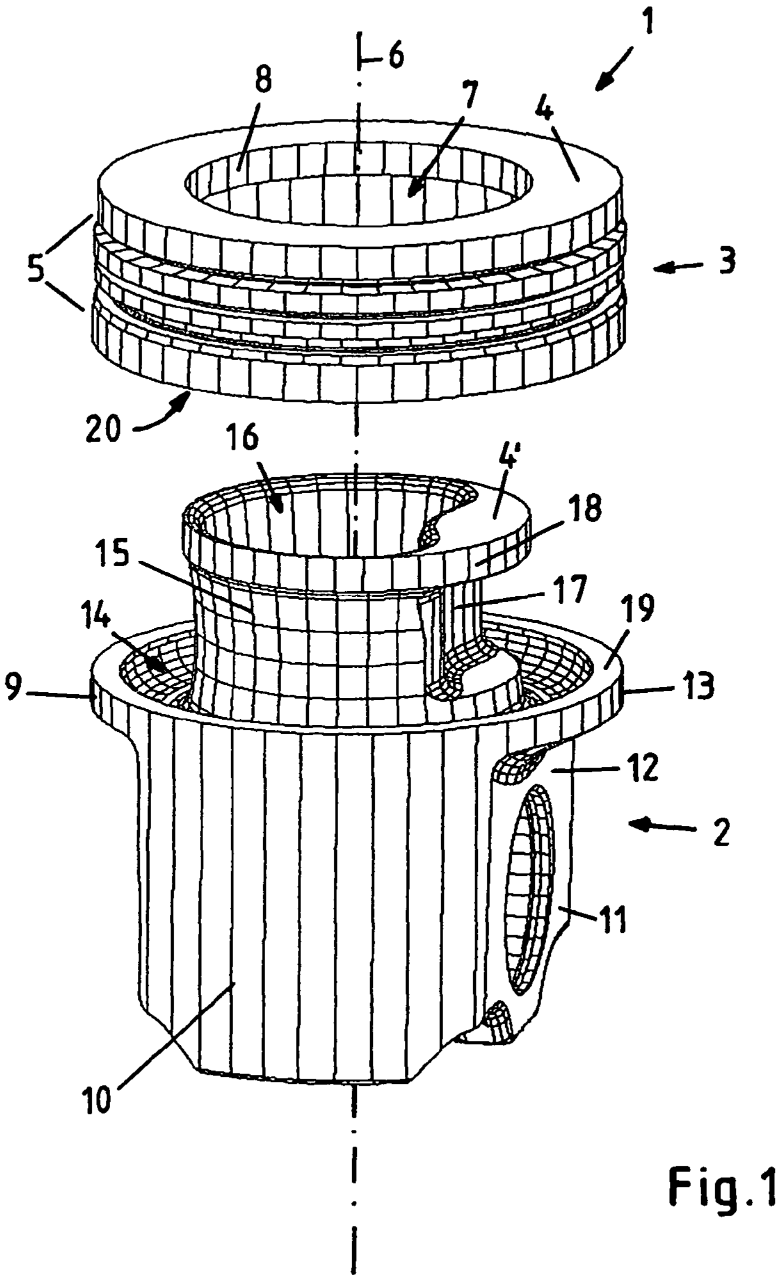

| | | | | |
|---|---|---|---|---|
| 4,651,631 | A * | 3/1987 | Avezou | 92/224 |
| 6,026,777 | A | 2/2000 | Kemnitz et al. | |
| 6,327,962 | B1 * | 12/2001 | Kruse | 92/186 |
| 6,698,391 | B1 * | 3/2004 | Kemnitz | 123/193.6 |
| 7,971,355 | B2 * | 7/2011 | Scharp | 29/888.042 |
| 2008/0134880 | A1 * | 6/2008 | Lapp et al. | 92/255 |

FOREIGN PATENT DOCUMENTS

| | | |
|---|---|---|
| DE | 27 30 120 | 1/1979 |
| DE | 29 19 638 | 11/1980 |
| DE | 198 46 152 | 4/2000 |
| DE | 102 09 331 | 9/2003 |
| DE | 600 28 870 | 1/2007 |
| EP | 1 061 249 | 12/2000 |
| EP | 1 077 324 | 2/2001 |
| GB | 2 163 072 | 2/1986 |
| WO | WO 2007/093289 | 8/2007 |

OTHER PUBLICATIONS

German Search Report dated May 5, 2008 with English translation of relevant parts.

* cited by examiner

TWO-PART PISTON FOR AN INTERNAL COMBUSTION ENGINE

CROSS REFERENCE TO RELATED APPLICATIONS

This application is the National Stage of PCT/DE2008/001394 filed on Aug. 23, 2008, which claims priority under 35 U.S.C. §119 of German Application No. 10 2007 044 106.3 filed on Sep. 15, 2007. The international application under PCT article 21(2) was not published in English.

The invention relates to a two-part piston for an internal combustion engine, in accordance with the preamble of claim 1.

A multi-part piston for an internal combustion engine is known from the Offenlegungsschrift [German unexamined patent application published for public scrutiny] DE-OS 24 34 902, which has a base body on the underside of which two pin bosses are formed. On the underside, the base body is connected with a piston skirt, and on the top, radially on the outside, it is connected with a ring element. It is also known from the above DE-OS to use a soldering/welding method, i.e. a hard-soldering method, to connect the base body with the piston skirt and with the ring element. In this connection, the ring element has a first solder connection on the radial inside of the part of the piston crown formed by the ring element. Since both the part of the piston crown formed by the base body and the part formed by the ring element have very thin walls, the disadvantage results that the solder connection also has a very short axial length and thus a very low strength.

On the side facing away from the piston crown, the ring element is furthermore connected with the base body by way of a relatively long, lower solder connection, seen in the radial direction. If, in this connection, the piston crown expands in the radial direction, partly due to pressure and partly due to temperature, due to a pressure stress caused by the explosion-like combustion of the fuel/air mixture that takes place in the combustion chamber bowl, and due to the very high temperatures that prevail in the region of the piston crown, the ring element widens in funnel shape, and the lower solder connection is exposed to great tensile stress. The piston known from the present state of the art has the disadvantage that in the region of the lower solder connection, no design measures are provided to reduce this tensile stress on the lower solder connection.

It is the task of the invention to avoid these disadvantages of the state of the art. This task is accomplished with the characteristics that stand in the characterizing part of the main claim. Practical embodiments of the invention are the object of the dependent claims.

In this connection, in the case of a funnel-shaped widening of the ring element, thinned, circumferential wall regions that lie close to the solder connections are deformed in hinge-like manner, and this brings with it a significant reduction in the tensile stress that acts on the solder connections during engine operation.

Figure 2:
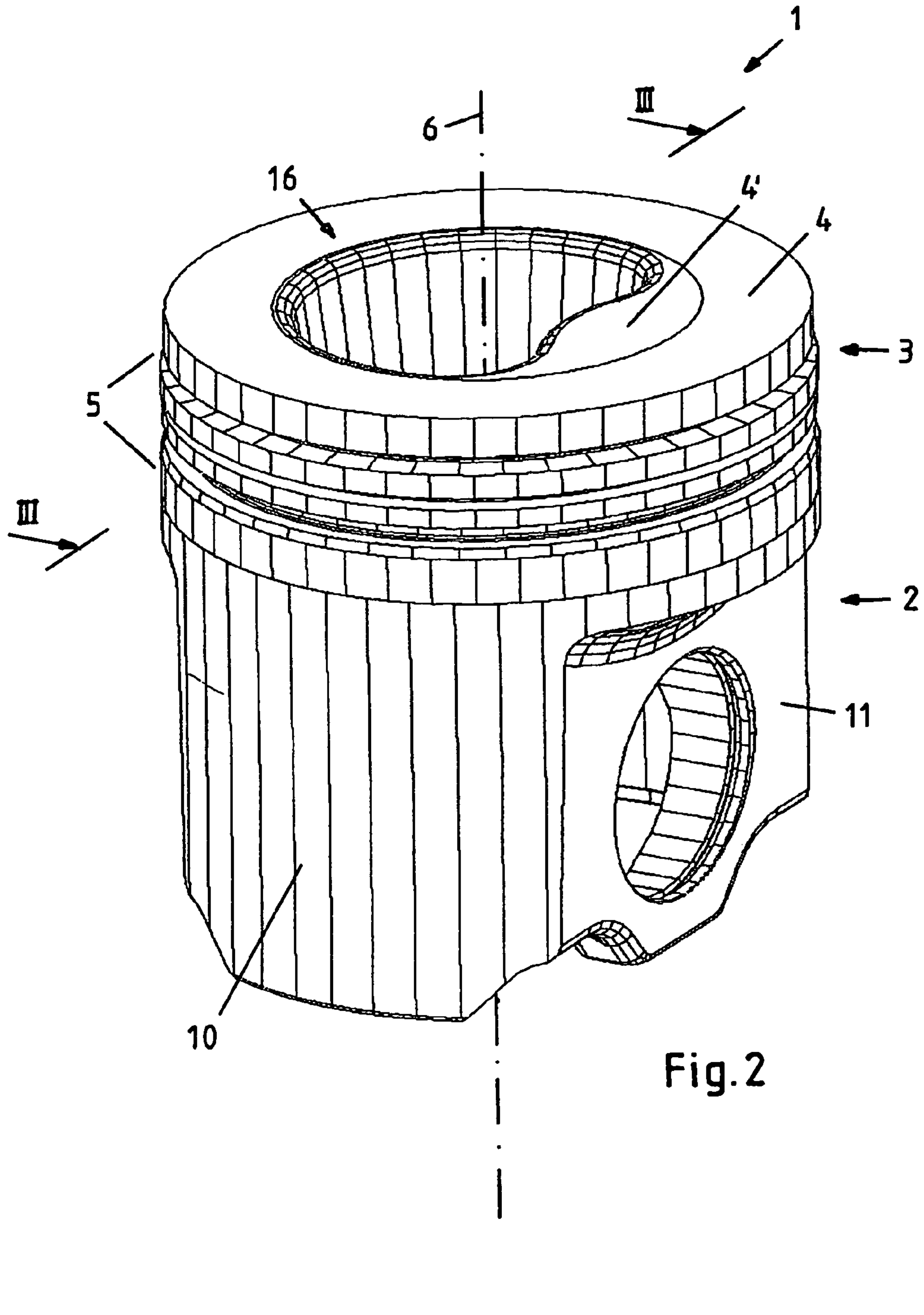
Figure 3:
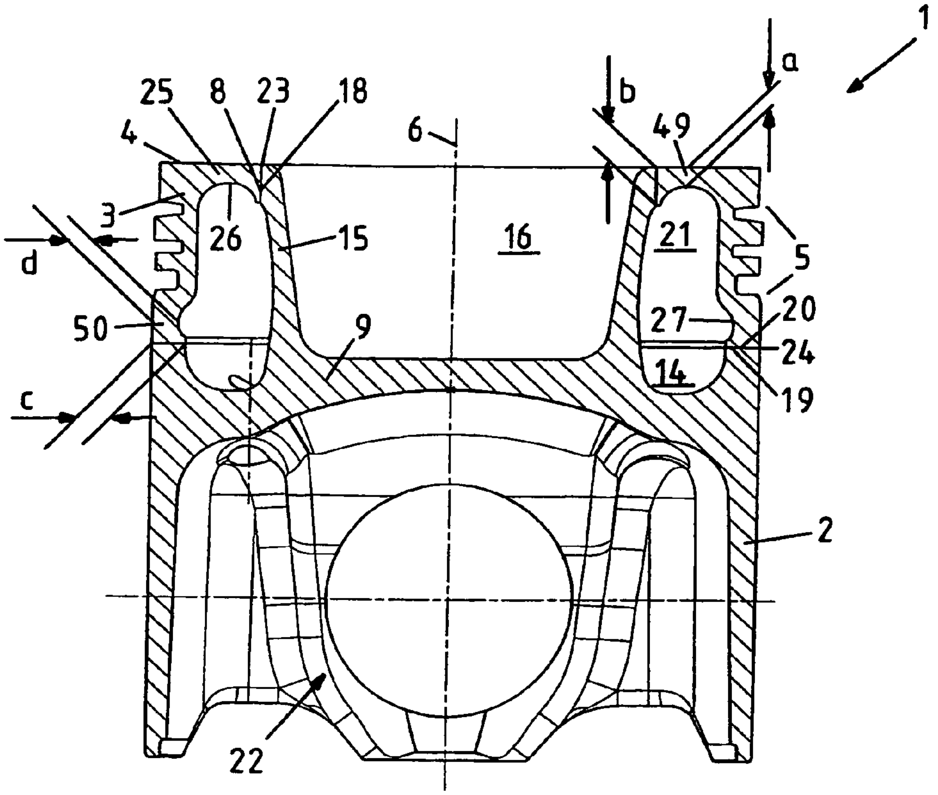
Figure 4:
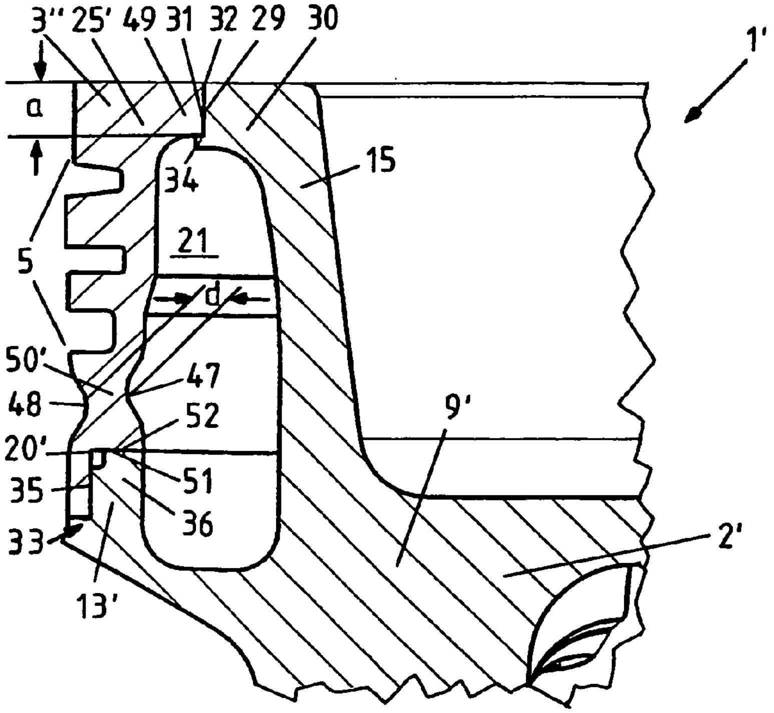
Figure 5:
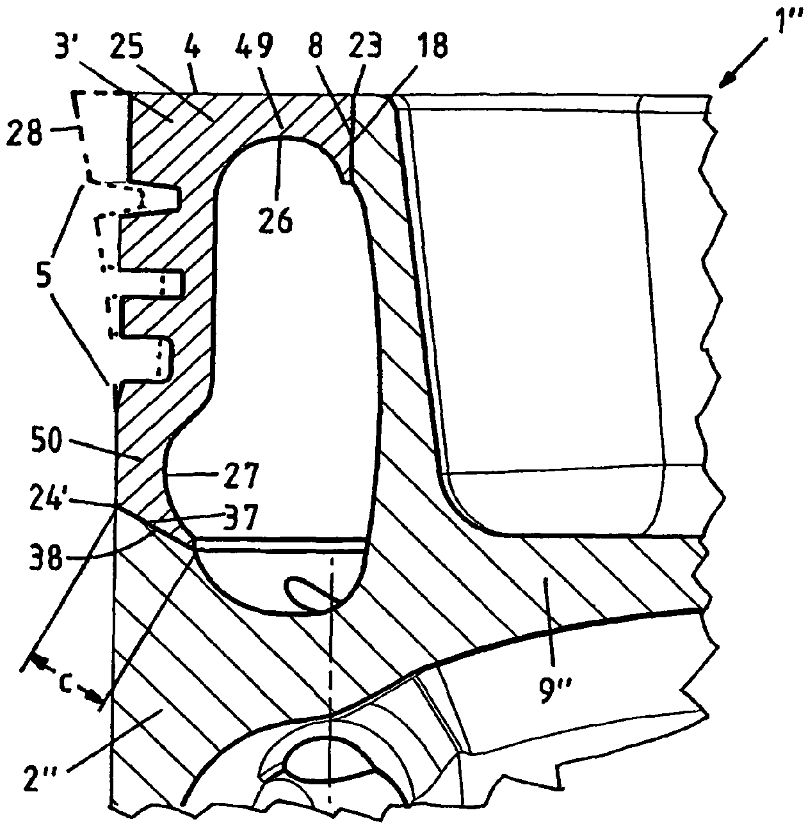
Figure 6:
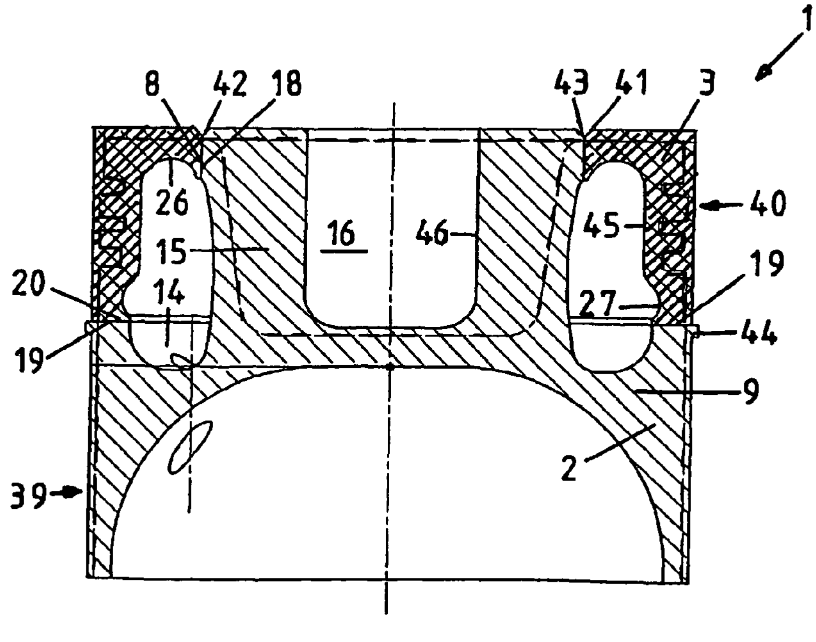

Some exemplary embodiments of the invention will be described in the following, using the drawings. These show:

FIG. 1 an exploded view of the piston according to the invention, consisting of a piston base body and a ring element, FIG. 2 a perspective view of the piston according to the invention, after its assembly, FIG. 3 a section through the piston along the piston axis and line III-III in FIG. 2, FIG. 4 a partial section through the piston in the region of the cooling channel, to show an embodiment of the solder connections, FIG. 5 a partial section through the piston in the region of the cooling channel, to show another embodiment of the solder connections, and FIG. 6 a partial section through the piston blank in the region of the cooling channel.

FIG. 1 shows a piston 1 in an exploded view, which consists of a piston base body 2 and a ring element 3. The piston base body 2 and the ring element 3 are made from AFP steel, in other words from a micro-alloyed, precipitation-hardening, ferritic-pearlitic steel on the basis of manganese/vanadium, according to DIN EN 10267. The piston base body 2 and the ring element 3 are soldered to one another within the scope of assembly of the piston 1.

The ring element 3 forms the essential part of the piston crown 4 that is configured in ring shape, and has a ring belt 5 on its radial outside, for accommodation of piston rings, not shown in the figure. A round opening 7 is made in the ring element 3, centered and with rotation symmetry relative to the piston axis 6, which opening is delimited, close to the piston crown 4, by a first, cylindrical surface 8 that serves as a solder surface during assembly of the piston 1.

The piston base body 2 consists of an essentially plate-shaped and round center part 9, on the underside of which, facing away from the piston crown 4, two skirt elements 10 that lie opposite one another and two pin bosses 11 that lie opposite one another and connect these skirt elements 10 with one another are formed on. The radially outer face sides 12 of the pin bosses 11 are set back in the direction of the piston axis 6, relative to the radially outer delimitation 13 of the center part 9.

A circumferential, channel-shaped recess 14 is formed into the top of the center part 9, surrounding a circumferential ring rib 15 disposed on the top of the center part 9, the interior of which rib forms the combustion bowl 16 of the piston 1.

In the present exemplary embodiment of the piston 1, the ring rib 15 and the combustion bowl 16 are not configured with rotation symmetry relative to the piston axis 6, but rather have an indentation 17 radially on the outside, the purpose of which consists in improving the combustion of the fuel/air mixture in the combustion bowl 16.

On the piston crown side, the delimitation of the ring rib 15 is configured to be circular, so that a part of the piston crown 4'is formed by it. Furthermore, a second cylindrical surface 18 that lies radially on the outside is formed by it, which also serves, as a counterpart to the first surface 8 of the ring element 3, as a solder surface, and forms an upper solder connection (23, see FIG. 3) between the ring element 3 and the piston base body 2, together with the surface 8.

Radially on the outside, the center part 9 has a ring-shaped, third surface 19 on its top, which serves as a solder surface and forms a lower solder connection between the ring element 3 and the piston base body 2, together with a fourth surface 20, not shown in FIG. 1, disposed on the lower face side of the ring element 3, that also serves as a solder surface. (See also FIG. 3 in this regard.)

Once the ring element 3 has been set onto the piston base body 2 and soldered to it, the piston 1 shown in FIG. 2 is obtained, which shows the piston crown 4, 4', the combustion bowl 16, the ring belt 5, a skirt element 10, and a pin boss 11.

The section through the piston along the piston axis 6 and the line III-III in FIG. 2 shown in FIG. 3 shows a ring-shaped cooling channel 21 delimited radially on the outside by the ring element 3, radially on the inside by the ring rib 15, and at the bottom by the recess 14 of the center part 9 of the piston base body 2, which channel has oil feed and oil drain channels that empty into the piston interior 22 and are not shown in the figure. The axially oriented upper solder connection 23 formed by the first and second surface 8 and 18 and the radially oriented lower solder connection 24 formed by the third and fourth surface 19 and 20 between the piston base body 2 and the ring element 3 are also shown.

In this connection, the first surface 8 represents the radially inner delimitation of the cover region 25 of the ring element 3 that forms the piston crown 4, whereby a circumferential recess 26, directed upward, is formed into the side of the cover region 25 that faces away from the piston crown, which recess forms a circumferential, upper, thinned wall region 49 here. In this connection, the ratio between the length b of the upper solder connection 23 and the minimal thickness a of the upper, thinned wall region 49 lies between 1 and 3, i.e. $1<b/a<3$.

On the piston crown side, the fourth surface 20, which forms the lower face side of the ring element 3, is followed by another circumferential recess 27, directed radially outward, which is formed into the radial inside of the ring element 3, and forms a lower, circumferential, thinned wall region 50 here, whereby the ratio between the length c of the lower solder connection 24 and the minimal thickness d of the lower, thinned wall region 50 also lies between 1 and 3, i.e. $1<c/d<3$. The recess 27 is disposed between the ring belt 5 and the lower solder connection 24.

In the event of a temperature stress and/or pressure stress on the piston 1, 1', 1", widening 28 of the upper part of the piston 1, 1', 1" occurs, as shown enlarged in FIG. 5, to illustrate the situation. The tensile stress that acts on the solder connections 23, 24, 24' when this happens is reduced by the thinned and therefore elastically resilient regions of the ring element 3, 3', which are formed by the recesses 26 and 27, and which deform in hinge-like manner during widening 28 of the upper piston part, to such an extent that the solder connections 23, 24, 24' continue to hold even after extended engine operation.

In FIG. 4, an embodiment of the piston 1' in the region of the cooling channel 21' is shown, in which the upper cover region 25' of the ring element 3" reaches radially on the inside only to the region of the lowest wall thickness a in the region of the upper, thinned wall region 49, and here forms a cylindrical surface 31 that lies radially on the outside, which, together with a cylindrical surface 29 of a circumferential collar 30, directed radially outward, which is formed onto the ring rib 15 on the piston crown side, and lies radially on the outside, forms an upper solder connection 32.

On the side facing away from the piston crown, the surface 29 is delimited by a step-shaped, circumferential formed-on part 34 on which the radially inner end of the cover region 25' rests.

The face side 20' of the ring element 3'", which faces away from the piston crown, has a circumferential, step-shaped recess 35 radially on the inside, in the exemplary embodiment according to FIG. 4, which recess is dimensioned in such a manner that it fits onto a circumferential collar 36 formed onto the radially outer delimitation 13' of the center part 9', on the piston crown side, so that when the piston 1' is assembled, the ring element 3" is pushed onto the collar 36 until the collar 36 sits in the recess 35, and the cover region 25' of the ring element 3" comes to lie against the formed-on part 34. A lower solder connection 33 is formed in the region of the face side 20' of the ring element 3", facing away from the piston crown, by the piston-crown-side face surface 51 of the collar 36 and by the skirt-side inner surface 52 of the recess 35.

In this way, the result is achieved that the ring element 3" is not only guided and centered over the surfaces 29 and 31 of the upper solder connection 32 when it is pushed onto the piston base body 2', but that additional guidance and centering of the ring element 3" is achieved also by way of the recess 35 and the collar 36 of the lower solder connection, during assembly of the piston 1'.

In place of a single recess 27, disposed radially on the inside, according to the exemplary embodiment of the piston 1, 1" shown in FIGS. 3 and 5, the exemplary embodiment of the piston 1' according to FIG. 4 has a circumferential recess 47 and 48 both on the inside and on the outside of the ring element 3", in each instance, above the lower solder connection 33, which recesses create a lower, thinned wall region 50' here, having the thickness d, which deforms in hinge-like manner in the event of widening 28 of the upper piston part (according to FIG. 5), and thus reduces the tensile stress on the lower solder connection 33 that occurs in this connection. The recesses 47 and 48 are disposed between the lower solder connection 33 and the ring belt 5.

FIG. 5 shows an embodiment of the piston 1" in which the solder connection 24' is formed by the lower face side 37 of the ring element 3', which narrows downward conically, and the surface 38, which also narrows downward conically, whereby the surface 38 delimits the radially outer region of the center part 9" on the piston crown side. In this way, an increase in size of the surfaces 37 and 38 and thus an increase in size of the lower solder connection 24', which narrows downward conically, having the length c is achieved, and this leads to a further improvement in the strength of the lower solder connection 24'.

The piston 1 according to the invention is produced in that first, a blank 39 for the piston base body 2 and a blank 40 for the ring element 3 are forged, as they are shown in FIG. 6, in which the two blanks 39 and 40 are drawn with cross-hatching, and in which the piston 1 that is produced from them, in the final analysis, is drawn in with a broken line within the cross-hatched area. The ring element 3 can also be produced using the method of rolling or drawing. In this connection, the radially inner edge of the blank 40, on the piston crown side, is provided with a bevel 41, and the radially outer edge of the blank 39, on the piston crown side, is provided with a bevel 42, which, as FIG. 6 shows, result in a circumferential recess 43, wedge-shaped in cross-section, when the two blanks 39 and 40 are put together.

Furthermore, within the scope of forging the blank 39, a circumferential projection 44 that is at least approximately rectangular in cross-section is formed onto the radially outer piston-crown-side edge of the third surface 19. Both the recess 43 and the projection 44 have the purpose explained further below, within the framework of connecting the two blanks by means of solder.

Subsequent to this, the rotation-symmetrical contours particularly shown in FIG. 1 are lathed into the radially outer surface of the ring rib 15 of the blank 39 and into the surface of the center part 9, whereby the recess 14 is also produced. The indentation 17 shown in FIG. 1 is milled into the radial outside of the ring rib 15. The rotation-symmetrical contours of the radial inner surface 45 of the ring element 3 and, in particular, the recesses 26, 27, 47, 48 are then also produced by means of lathing.

Subsequent to this, the two blanks 39 and 40 are then soldered to one another. In this connection, it is first of all necessary to put the blanks 39 and 40 together in such a manner that a gap occurs between the surfaces 8 and 18 and between the surfaces 19 and 20, in each instance, which is between 10 μm and 200 μm wide. When the blanks 39 and 40 are put together, a gap having this width is already achieved in that both the surfaces 8 and 18 and the surfaces 19 and 20 are brought into contact with one another without shape fit.

The recess 43 and the piston-crown-side surface of the projection 44 are then coated with a solder paste on the basis of nickel, after which the two blanks 39, 40 including the solder paste are heated to 1150° C. In this connection, the solder paste liquefies and penetrates between the surfaces 8 and 18 and the surfaces 19 and 20 due to the capillary effect, whereby the liquefied solder forces a gap having the dimensions indicated above to form between the surfaces 8 and 18 and the surfaces 19 and 20, due to the capillary effect. As a result, the surfaces 8, 18, 19, and 20 are wetted completely. Within the scope of the targeted cooling of the piston 1 that takes place afterwards, the solder paste solidifies and yields a defect-free solder connection between the two partly machined blanks 39 and 40.

In the embodiment of the piston base body 2' and the ring element 3" according to FIG. 4, the gap between the surfaces 29 and 31 of the upper solder connection 32 that is sufficient for a defect-free solder connection, of 10 μm to 200 μm, is achieved, in that the surfaces 29 and 31 are machined to such an extent, using a precision-lathing process, that the gap between the two surfaces 29 and 31 has the dimensions given above, of 10 μm to 200 μm, after the collar 36 has been fixed in place in the recess 35 with tight play.

The formed-on part 34, on which the cover region 35' of the ring element 3" comes to rest during assembly of the piston 1', ensures, in this connection, that the piston-crown-side face surface 51 of the collar 36 and the skirt-side inner surface 52 of the recess 35 have a gap of 10 μm to 200 μm from one another after piston assembly, so that here, too, a gap that is broad enough for a defect-free solder connection is obtained.

In the embodiment of the piston base body 2" and the ring element 3' according to FIG. 5, a gap having a constant width of 10 μm to 200 μm occurs between the surfaces 8 and 18, for a reliable upper solder connection 23, in that after corresponding precision-machining of the surfaces 8 and 18, the ring element 3' is set onto the radially outer piston-crown-side face surface 38 of the piston base body 2", which is shaped conically, by way of the lower face side 37 of the ring element, which is also oriented conically, whereby the ring element 3' is oriented symmetrically relative to the piston axis simply by means of the conicity of the two surfaces 37 and 38. In this connection, the capillary effect brings about the result that the solder, which is liquefied after heating, penetrates into the gap between the surfaces 37 and 38, in order to securely solder these surfaces to one another, as well.

The use of the soldering method for connecting the two piston parts has the advantage that the soldering temperature of 1150° C., to which the piston is heated in this connection, is equal to the forging temperature at which the two blanks 39 and 40 are forged, so that during cooling, the material characteristics that are typical for AFP steel can be set during cooling, in targeted manner.

Subsequent to this, the piston 1 is finished, in that the rotation-symmetrical outer contours of the piston 1, drawn in with broken lines in FIG. 6, are produced by means of lathing, and the non-rotation-symmetrical delimitation surfaces 46 of the combustion bowl 16, which are also drawn in with broken lines, are produced by means of milling. In this connection, it is also possible to weld the piston base body 2, 2', 2" and the ring element 3, 3', 3" to one another.

Reference Symbol List a thickness of the upper, thinned wall region 49
b length of the upper solder connection
c length of the lower solder connection
d thickness of the lower, thinned wall region 50, 50'
1, 1', 1" piston
2, 2', 2" piston base body
3, 3', 3" ring element
4, 4' piston crown
5 ring belt
6 piston axis
7 opening
8 first surface
9, 9', 9" center part
10 skirt element
11 pin boss
12 face side of the pin boss 11
13, 13' delimitation of the center part 9
14 recess
15 ring rib
16 combustion bowl
17 indentation
18 second surface
19 third surface
20, 20' fourth surface
21, 21' cooling channel
22 piston interior
23 upper solder connection
24, 24' lower solder connection
25, 25' cover region
26, 27 recess
28 widening
29 surface
30 collar
31 surface
32 upper solder connection
33 lower solder connection
34 formed-on part
35 recess
36 collar
37 surface, lower face surface of the ring element 3'
38 surface, face surface
39 blank for the base body 2
40 blank for the ring element 3
41, 42 bevel
43 recess
44 projection
45 inner surface of the ring element 3
46 delimitation surface of the combustion bowl 16
47, 48 recess
49 upper, thinned wall region
50, 50' lower, thinned wall region
51 piston-crown-side face surface of the collar 36
52 skirt-side inner surface of the recess 35

The invention claimed is:

1. Two-part piston (1, 1', 1") for an internal combustion engine, consisting of a piston base body (2, 2', 2") and a ring element 3, 3', 3"), wherein the piston base body (2, 2', 2") has a round, essentially plate-shaped center part (9, 9', 9"), the radial diameter of which is at least approximately identical with the radial diameter of the piston (1, 1', 1"), wherein two skirt elements (10) that lie opposite one another and two pin bosses (11) that lie opposite one another and connect the skirt elements (10) with one another are formed onto the underside of the center part (9, 9', 9"), and wherein a circumferential ring rib (15), set back in the direction of the piston axis (6) relative to the radially outer edge of the center part (9, 9', 9"), is formed onto the top of the center part (9, 9', 9"), which rib forms the radially outer delimitation of a combustion bowl (16), wherein the ring element (3, 3', 3") has a ring belt (5) on its radial outer surface, and wherein the ring element (3, 3', 3") is soldered to the piston base body (2, 2', 2") by way of an upper solder connection (23, 32) having the length b, which is disposed on the radial inside of a piston crown (4) formed at least in part by the ring element (3, 3', 3"), and by way of a lower solder connection (24, 24', 33) having the length c, which is disposed radially outside on the top of the center part (9, 9', 9"), wherein the ring element (3, 3', 3") has, for one thing, a circumferential, upper, thinned wall region (49) in the region of the piston crown (4), radially outside of the upper solder connection (23, 32), and, for another, a circumferential, lower, thinned wall region (50, 50') between the ring belt (5) and the lower solder connection (24, 24', 33), wherein the thickness (a, d) of the thinned wall regions (49, 50, 50') has a lower value than the length (b, c) of the solder connections (23, 24, 24', 32, 33).

2. Piston (1, 1', 1") according to claim 1, wherein the ratio between the length b of the upper solder connection (23, 32) and the thickness a of the upper, thinned wall region (49) is greater than 1 and less than 3, so that the following applies:

$1<b/a<3$.

3. Piston (1, 1', 1") according to claim 2, wherein the ratio between the length c of the lower solder connection (24, 24', 33) and the thickness d of the lower, thinned wall region (50, 50') is greater than 1 and less than 3, so that the following applies:

$1<c/d<3$.

4. Piston (1, 1") according to claim 1, wherein the ring element (3, 3') has a cover region (25) that partly forms the piston crown (4), whereby a circumferential recess (26) directed upward is formed into the side of the cover region (25) that faces away from the piston crown, which recess forms the upper, thinned wall region (49).

5. Piston (1, 1") according to claim 1, wherein a circumferential recess (27) directed radially outward is formed into the radial inside of the ring element (3, 3'), between the lower solder connection (24, 24') and the ring belt (5), which recess forms the lower, thinned wall region (50).

6. Piston (1') according to claim 1, wherein a circumferential recess (47) directed radially outward is formed into the radial inside of the ring element (3") between the lower solder connection (33) and the ring belt (5), and a circumferential recess (48) directed radially inward is formed into the radial outside of the ring element (3"), and wherein the two recesses (47, 48) lie opposite one another and form the lower, thinned wall region (50').

7. Piston (1") according to claim 1, wherein the lower solder connection (24') is formed by a lower face side (37) of the ring element (3') that narrows downward conically, and by a surface (38) that delimits the radially outer region of the center part (9") on the piston crown side and also narrows downward conically.

* * * * *